(12) United States Patent
Militano et al.

(10) Patent No.: US 10,264,546 B2
(45) Date of Patent: Apr. 16, 2019

(54) PAGING PROCEDURE FOR A WIRELESS DEVICE, A RADIO ACCESS NODE, METHODS PERFORMED THEREIN, A COMPUTER PROGRAM, AND A COMPUTER-READABLE STORAGE MEDIUM

(71) Applicant: Telefonaktiebolaget LM Ericsson (publ), Stockholm (SE)

(72) Inventors: Francesco Militano, Stockholm (SE); Magnus Stattin, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 11 days.

(21) Appl. No.: 15/516,513

(22) PCT Filed: Oct. 7, 2014

(86) PCT No.: PCT/SE2014/051161
§ 371 (c)(1),
(2) Date: Apr. 3, 2017

(87) PCT Pub. No.: WO2016/056954
PCT Pub. Date: Apr. 14, 2016

(65) Prior Publication Data
US 2018/0242275 A1 Aug. 23, 2018

(51) Int. Cl.
*H04W 4/70* (2018.01)
*H04W 8/24* (2009.01)
(Continued)

(52) U.S. Cl.
CPC .......... *H04W 68/005* (2013.01); *H04W 4/70* (2018.02); *H04W 8/24* (2013.01); *H04W 64/003* (2013.01);
(Continued)

(58) Field of Classification Search
CPC ..... H04W 4/70; H04W 68/005; H04W 68/02; H04W 52/0216
See application file for complete search history.

(56) References Cited

U.S. PATENT DOCUMENTS

2006/0092942 A1* 5/2006 Newson ................. H04L 29/06
370/392
2010/0220680 A1* 9/2010 Ramankutty ......... H04W 68/08
370/329
(Continued)

FOREIGN PATENT DOCUMENTS

WO 2013007193 A1 1/2013

OTHER PUBLICATIONS

Huawei, "Solution for Overload Control", 3GPP Draft, S2-102268, 3rd Generation Partnership Project (3GPP), Mobile Competence Centre, 650, Route Des Lucioles, F-06021 Sophia-Antipolis Cedex, France, vol. SA WG2, No. Kyoto, 20100510, May 4, 2010, XP050434467, 4 pages.
(Continued)

*Primary Examiner* — Dung Hong
(74) *Attorney, Agent, or Firm* — Sage Patent Group

(57) ABSTRACT

Embodiments herein relate to a method performed in a radio access node (12) for handling a wireless device (10) in a wireless communication network (1), which radio access node serves a cell (11) in the wireless communication network (1). The radio access node (12): —receives (501) a paging request for the wireless device (10) from a network node (13,14), which paging request comprises an indication, which indication indicates that the paging request is associated with a function relating to the wireless device (10), which function requires no connection between the wireless device (10) and the radio access node (12) to be set up; —pages (502) the wireless device in the cell (11) with a page message; —receives (503) a response from the wireless
(Continued)

device (10) in response to the page message; and —rejects (505) a connection establishment or releases (506) a connection, from the wireless device (10) to the radio access node (12), based on the indication in the received paging request and/or an indication in the received response indicating that no connection establishment is necessary.

18 Claims, 8 Drawing Sheets

(51) Int. Cl.
  *H04W 64/00* (2009.01)
  *H04W 68/00* (2009.01)
  *H04W 74/08* (2009.01)
  *H04W 76/18* (2018.01)
  *H04W 76/30* (2018.01)
  *H04W 76/27* (2018.01)

(52) U.S. Cl.
  CPC ....... *H04W 74/0833* (2013.01); *H04W 76/18* (2018.02); *H04W 76/27* (2018.02); *H04W 76/30* (2018.02)

(56) References Cited

U.S. PATENT DOCUMENTS

| | | | | |
|---|---|---|---|---|
| 2011/0110302 A1* | 5/2011 | Faurie | H04W 36/0022 | 370/328 |
| 2012/0155257 A1* | 6/2012 | Tiwari | H04W 60/005 | 370/230 |
| 2013/0170479 A1* | 7/2013 | Fong | H04W 74/085 | 370/336 |
| 2013/0201870 A1* | 8/2013 | Gupta | H04W 4/70 | 370/254 |
| 2013/0260811 A1* | 10/2013 | Rayavarapu | H04W 76/19 | 455/509 |
| 2013/0303088 A1* | 11/2013 | Watfa | H04W 76/14 | 455/41.2 |
| 2015/0156692 A1* | 6/2015 | Kim | H04W 8/02 | 455/436 |
| 2015/0249900 A1* | 9/2015 | Kim | H04W 24/10 | 370/252 |
| 2016/0073236 A1* | 3/2016 | Kim | H04W 8/02 | 370/329 |
| 2017/0230895 A1* | 8/2017 | Zhang | H04W 76/10 | |
| 2017/0245315 A1* | 8/2017 | Watfa | H04W 76/14 | |
| 2017/0245318 A1* | 8/2017 | Rayavarapu | H04W 68/005 | |
| 2018/0139671 A1* | 5/2018 | Velev | H04W 4/70 | |

OTHER PUBLICATIONS

"3rd Generation Partnership Project; Technical Specification Group Radio Access Network; Study on RAN Improvements for Machine-type Communications; (Release 10)", [Online], May 15, 2014, (May 15, 2014), 3GPP Draft, R2-114815 TR37.868 V1.0.0, 3rd Generation Partnership Project (3GPP), Mobile Competence Centre, 650, Route Des Lucioles; F-06921 Sophia-Antipolis Cedex, France, XP050816286, 25 pages.

"3rd Generation Partnership Project; Technical Specification Group Services and System Aspects; General Packet Radio Service (GPRS) enhancements for Evolved Universal Terrestrial Radio Access Network (E-UTRAN) access (Release 12)", 3GPP TS 23.401, V12.4.0 (Mar. 2014), 302 pages.

3rd Generation Generation Partnership Project; Technical Specification Group Core Network and Terminals; Non-Access-Stratum (NAS) protocol for Evolved Packet System (EPS); Stage 3 (Release 12), 3GPP TS 24.301, V12.4.0 (Mar. 2014), 362 pages.

Internatioal Search Report and Written Opinion dated Jun. 16, 2015 in International application No. PCT/SE2014/051161, 10 pages.

* cited by examiner

PAGING PROCEDURE FOR A WIRELESS DEVICE, A RADIO ACCESS NODE, METHODS PERFORMED THEREIN, A COMPUTER PROGRAM, AND A COMPUTER-READABLE STORAGE MEDIUM

CROSS-REFERENCE TO RELATED APPLICATIONS

This application is a 35 U.S.C. § 371 National Stage of International Patent Application No. PCT/SE2014/051161, filed Oct. 7, 2014, and designating the United States.

TECHNICAL FIELD

Embodiments herein relate to a wireless device, a radio access node, methods performed therein, a computer program, and a computer-readable storage medium. In particular, embodiments herein relate to handling the wireless device in a wireless communication network.

BACKGROUND

In a typical wireless communication network, wireless devices, also known as mobile stations and/or user equipments (UEs), communicate via a Radio Access Network (RAN) to one or more core networks (CN). The RAN covers a geographical area which is divided into cell areas, with each cell area being served by a radio access node such as a base station, e.g., a radio base station (RBS), which in some networks may also be called, for example, a "NodeB" or "eNodeB". A cell is a geographical area where radio coverage is provided by the radio base station at a base station site or an antenna site in case the antenna and the radio base station are not collocated. Each cell is identified by an identity within the local radio area, which is broadcast in the cell. Another identity identifying the cell uniquely in the whole wireless communication network is also broadcasted in the cell. One base station may have one or more cells. The base stations communicate over the air interface operating on radio frequencies with the wireless devices in downlink (DL) or uplink (UL) transmissions within range of the base stations.

A Universal Mobile Telecommunications System (UMTS) is a third generation mobile communication system, which evolved from the Second Generation (2G) Global System for Mobile Communications (GSM). The UMTS terrestrial radio access network (UTRAN) is essentially a RAN using Wideband Code Division Multiple Access (WCDMA) and/or High Speed Packet Access (HSPA) for wireless devices. In a forum known as the Third Generation Partnership Project (3GPP), telecommunications suppliers propose and agree upon standards for third generation networks and UTRAN specifically, and investigate enhanced data rate and radio capacity. In some versions of the RAN as e.g. in UMTS, several base stations may be connected, e.g., by landlines or microwave, to a controller node, such as a Radio Network Controller (RNC) or a Base Station Controller (BSC), which supervises and coordinates various activities of the plural base stations connected thereto. The RNCs are typically connected to one or more core networks.

Specifications for the Evolved Packet System (EPS) have been completed within the 3$^{rd}$ Generation Partnership Project (3GPP) and this work continues in the coming 3GPP releases. The EPS comprises the Evolved Universal Terrestrial Radio Access Network (E-UTRAN), also known as the Long Term Evolution (LTE) radio access, and the Evolved Packet Core (EPC), also known as System Architecture Evolution (SAE) core network. E-UTRAN/LTE is a variant of a 3GPP radio access technology wherein the radio base stations are directly connected to the EPC core network rather than to RNCs. In general, in E-UTRAN/LTE the functions of a RNC are distributed between the radio base stations, e.g. eNodeBs in LTE, and the core network. As such, the Radio Access Network (RAN) of an EPS has an essentially "flat" architecture comprising radio base stations without reporting to RNCs.

A currently popular vision of the future development of the communication in wireless communication networks comprises huge numbers of small autonomous wireless devices, which typically, more or less infrequently, e.g. once per week to once per minute, transmit and receive only small amounts of data, or are polled for data. These wireless devices are assumed not to be associated with humans, but are rather sensors or actuators of different kinds, which communicate with application servers, which configure the wireless devices and receive data from them, within or outside the wireless communication network. Hence, this type of communication is often referred to as Machine-to-Machine (M2M) communication and the wireless devices may be denoted Machine Devices (MDs). In the 3GPP standardization the corresponding alternative terms are Machine Type Communication (MTC) and MTC devices, with the latter being a subset of the more general term user equipments, UE, or wireless devices. FIG. 1 shows the current state of the 3GPP reference network architecture for Machine Type Communication. In the figure double frame indications for MTC specific entities have been added. Currently the only function that is specified for a Services Capability Server (SCS) is triggering of MTC devices e.g. wireless devices or UEs with a MTC UE application for which an Internet Protocol (IP) address is not available or reachable by the SCS and/or an Application Server (AS). The trigger may cause the MTC device to perform application specific actions that include initiating communication with the SCS or the AS. The SCS may also be regarded as a potential location for future MTC related features. In an indirect model, denoted model 1, the AS is connected to the SCS, which is connected to an MTC-Interworking Function (IWF). The MTC-IWF is connected via a Home Subscriber Server (HSS) to a MTC Authentication, Authorization and Accounting (AAA) server. In the direct model, denoted model 2, the AS is connected to a Gateway GPRS Support Node (GGSN) or Packet Data Network Gateway (P-GW). One may also combine the models into a hybrid model. Control plane is marked with dotted lines and user plane is marked with lines between nodes.

With the nature of MTC devices and the assumed typical uses of the MTC devices follow that MTC devices will often have to be very energy efficient, since external power supplies will often not be available and since it is neither practically nor economically feasible to frequently replace or recharge batteries of the MTC devices. In some scenarios the MTC devices may not even be battery powered, but may instead rely on energy harvesting, i.e. gathering energy from the environment, opportunistically utilizing, the often very limited, energy that may be tapped from sun light, temperature gradients, vibrations, etc.

Random Access Procedure

Before the wireless device may communicate with the wireless communication network, the wireless device have to perform a random access procedure. The random access procedure comprises four actions explained in reference to FIG. 2. Only contention based procedure is shown in FIG. 2.

Action 21: Msg1

The wireless device selects one of the 64 available Random Access Channel (RACH) preambles, or preamble sequences.

The wireless device also needs to give its own identity to the wireless communication network, or the base station, so that wireless communication network can address it in next action. The identity which the wireless device will use is called Random Access-Radio Network Temporary Identity (RA-RNTI). Basically it's not some value sent by the wireless device but interestingly RA-RNTI is determined from a time slot number in which the RACH preamble is sent in a RACH Request.

If the wireless device does not receive any response from the wireless communication network, it increases its power in a fixed step and sends the RACH preamble again.

Action 22: Msg2

Base station sends "Random Access Response" to the wireless device on Downlink-Shared Channel (DL-SCH) addressed to RA-RNTI calculated from the timeslot in which RACH preamble was sent, as explained in action 21, about RA-RNTI calculation.

The message Random Access Response carries following information:

Temporary Cell Radio Network Temporary Identity (C-RNTI): base station gives another identity to the wireless device which is called temporary C-RNTI for further communication.

Timing Advance Value: base station also informs the wireless device to change its timing so it can compensate for the round trip delay caused by wireless device distance from the base station.

Uplink Grant Resource: base station will assign initial resource to the wireless device so that the wireless device can use Uplink-Shared Channel (UL-SCH).

Action 23: Msg3

Using UL-SCH, the wireless device sends a "RRC connection request message" to the base station, RRC stands for Radio Resource Control.

The wireless device is identified by temporary C-RNTI assigned in the previous action by the base station.

The RRC connection request message comprises following:

Wireless device identity; e.g. a Temporary Mobile Subscriber Identity (TMSI) or a Random Value, TMSI is used if the wireless device has previously connected to the same wireless communication network. With the TMSI value, the wireless device is identified in the core network The random value is used if the wireless device is connecting for the very first time to wireless communication network. This is because there is a possibility that Temporary C-RNTI has been assigned to more than one wireless device in the previous action, due to multiple requests coming at same time, a Collision scenario will be explained later.

Connection establishment cause: shows the reason why the wireless device needs to connect to the wireless communication network.

Action 24: Msg4

The base station responds with a contention resolution message to the wireless device whose message was successfully received in action 23. This message is address towards the TMSI value or the random value but contains the new C-RNTI which will be used for further communication.

Normal Paging Procedure:

When the wireless communication network wants to page a wireless device, the wireless communication network sends a Paging message to all the base stations being a part of a same Tracking Area, or part of a Tracking Area list. The message contains the identity (ID) of the wireless device that the network wants to page. The base station builds a paging message which is transmitted on a Paging Channel (PCH).

The wireless device, listening to the Paging Channel, receives the paging message and tries to establish an RRC connection, by a Random Access procedure as explained in FIG. 2 above.

The wireless communication network then responds to the RACH request, allowing the wireless device to establish an RRC connection. The wireless device will probably receive some data, after which the RRC Connection is not needed and can be released.

The paging procedure is described in more details below with actions related to certain network nodes.

Serving Gateway (S-GW):
1. DL data arrives for the wireless device at the S-GW.
2. The S-GW creates a DL Data Notification message and forwards the DL Data Notification message to a Mobility Management Entity (MME).

Mobility Management Entity (MME):
1. When the wireless device is in EPS Connection Management (ECM)-Idle state, the location is known to the MME on a per Tracking Area (TA) basis. Therefore, the MME has to page all base stations within a group of the TA.
2. The MME starts a timer '3413' when:
   a. paging is for Packet Switched (PS) data
   b. the wireless device is addressed by System Architecture Evolution (SAE)-TMSI
3. List of Tacking Area Identity (TAI): The MME informs the base station to broadcast the Paging messages in the mentioned TAI's.
4. The MME sends a DL Data Notification Acknowledgement (ACK) message to the S-GW.

Base Station:
1. The base station receives a S1 Application Protocol (S1AP) message from the MME indicating paging and the base station constructs an RRC Paging message.
2. The base station generates a paging message that may contain multiple PAGING RECORDS to page multiple wireless devices.

Wireless Device:
1. The wireless device wakes up every Paging occasion and searches for Paging (P)-RNTI within a Physical Downlink Control Channel (PDCCH) transmission.
2. If the wireless device finds the P-RNTI then the wireless device proceeds to decode a Physical Downlink Shared Channel (PDSCH) information which is present in the PDCCH.
3. The wireless device decodes the paging message from a PDSCH Resource Block within which the PAGING message is sent.
4. If the wireless device doesn't find its own wireless device identity then the wireless device returns to monitor the Paging Occasion.

5. When the wireless device finds its identity in the message it triggers the Random Access Procedure, as shown in FIG. 2, followed by establishing an RRC Connection.
6. If PAGING is for PS domain then the wireless device Non Access Stratum (NAS) layer triggers a SERVICE REQUEST, otherwise, if the PAGING is for Circuit Switched FallBack (CSFB) then the wireless device triggers an Extended SERVICE REQUEST.

The current Paging procedure as described above, and thus the communication of the wireless device, is too costly for a wireless device, in terms of signalling and therefore also for the battery consumption at the wireless device.

SUMMARY

An object of embodiments herein is to provide a mechanism that handles a wireless device or communication of the wireless device in an efficient manner.

According to an aspect the object is achieved by a method performed in a radio access node for handling a wireless device in a wireless communication network. The radio access node serves a cell in the wireless communication network. The radio access node receives a paging request for the wireless device from a network node. The paging request comprises an indication, which indication indicates that the paging request is associated with a function relating to the wireless device. The function requires no connection between the wireless device and the radio access node to be set up. The radio access node pages the wireless device in the cell with a page message. The radio access node receives a response from the wireless device in response to the page message. The radio access node then rejects a connection establishment, or the radio access node releases a connection, from the wireless device to the radio access node, based on the indication in the received paging request and/or an indication in the received response indicating that no connection establishment is necessary.

According to another aspect the object is achieved by providing a method performed in a wireless device for handling communication in a wireless communication network. The radio communication network comprises a radio access node serving the wireless device in a cell of the radio access node. The wireless device receives a message from the radio access node, which message comprises an indication that a paging is requested associated with a function relating to the wireless device. The function requires no connection between the wireless device and the radio access node to be set up. The wireless device transmits a response to the radio access node in response to the received message, which response comprises an indication indicating that no connection establishment is necessary.

According to yet another aspect the object is achieved by providing a radio access node for handling a wireless device in a wireless communication network. The radio access node is configured to serve a cell in the wireless communication network. The radio access node is configured to receive a paging request for the wireless device from a network node. The paging request comprises an indication, which indication indicates that the paging request is associated with a function relating to the wireless device. The function requires no connection between the wireless device and the radio access node to be set up. The radio access node is configured to page the wireless device in the cell with a page message, and to receive a response from the wireless device in response to the page message. The radio access node is further configured to reject a connection establishment, or release a connection, from the wireless device to the radio access node, based on the indication in the received paging request, and/or an indication in the received response indicating that no connection establishment is necessary.

According to still yet another aspect the object is achieved by providing a wireless device for handling communication in a wireless communication network. The wireless device is configured to be served by a radio access node in a cell of the radio access node in the wireless communication network. The wireless device is configured to receive a message from the radio access node, which message comprises an indication that a paging is requested associated with a function relating to the wireless device. The function requires no connection between the wireless device and the radio access node to be set up. The wireless device is configured to transmit a response to the radio access node in response to the received message, which response comprises an indication indicating that no connection establishment is necessary.

Furthermore, embodiments provide a computer program and a computer-readable storage medium, having stored thereon a computer program, comprising instructions which, when executed on at least one processor, cause the at least one processor to carry out the methods herein.

An advantage of embodiments of the claimed procedure, is that the network, e.g. an MME or the radio access node, is allowed to perform a function e.g. find in which cell the wireless device is present, utilizing a minimum amount of signalling messages by the wireless device. Embodiments herein allow the wireless device to save battery, which is in particular needed when the wireless device is communicating seldomly such as in e.g. an MTC device. This results in an efficient handling of the wireless device or efficient handling of the communication of the wireless device.

BRIEF DESCRIPTION OF THE DRAWINGS

Embodiments will now be described in more detail in relation to the enclosed drawings, in which.

DETAILED DESCRIPTION

Figure 1:
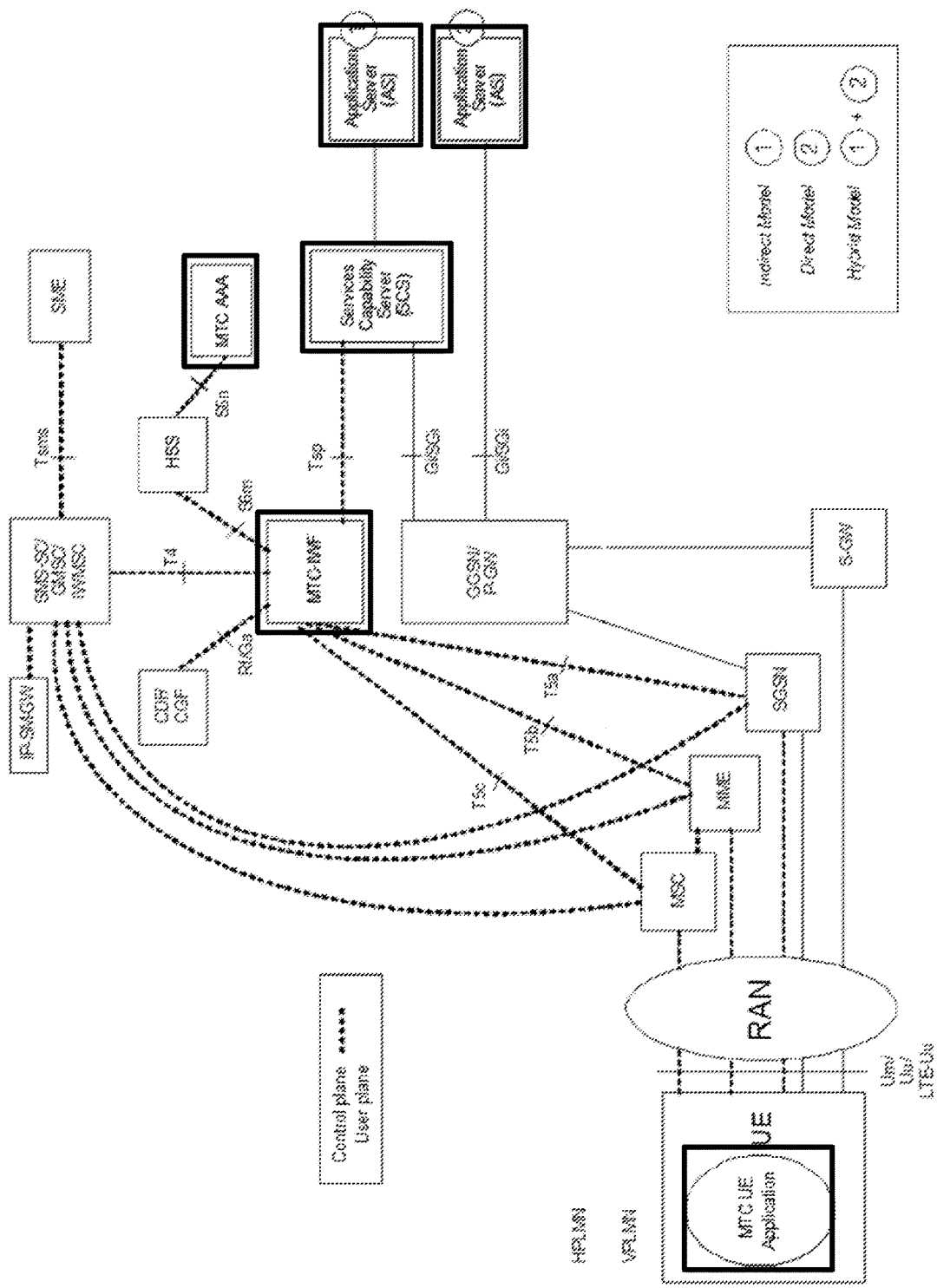
FIG. 1 shows an architecture of a MTC communication.
Figure 2:
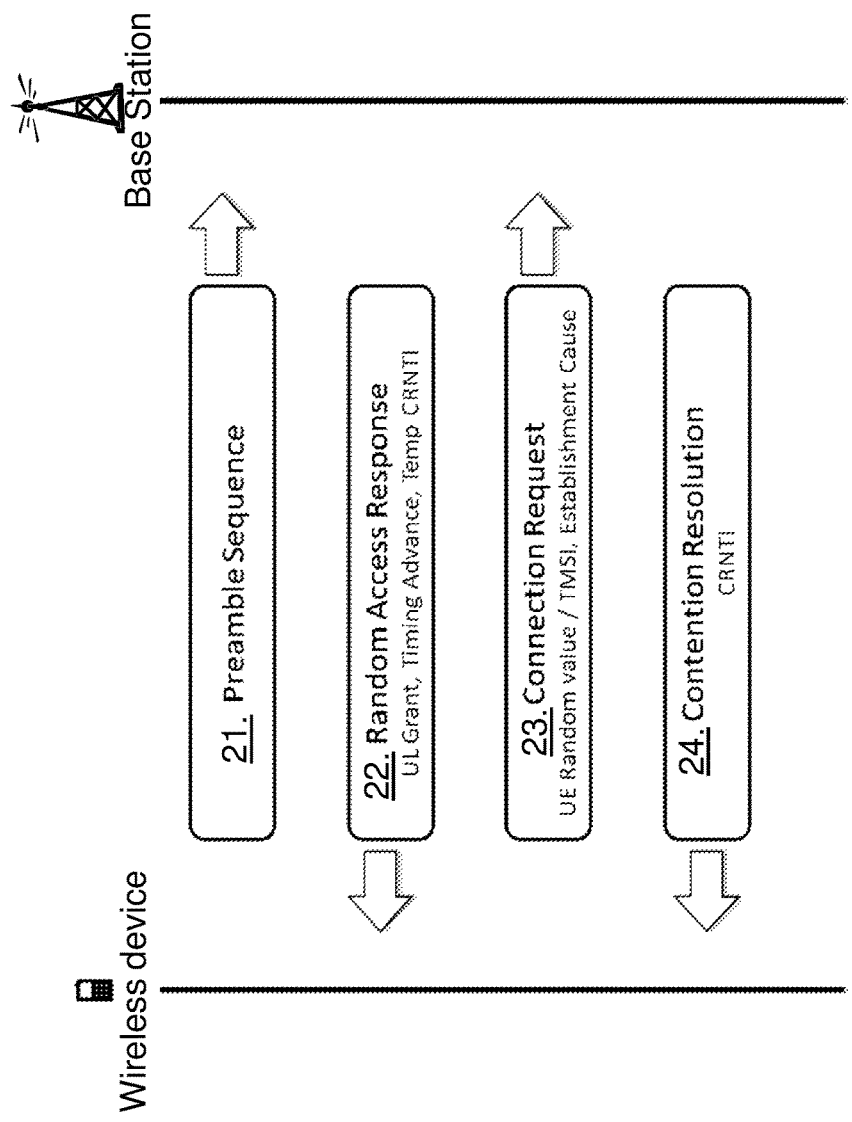
FIG. 2 shows a schematic overview of a random access process.
Figure 3:
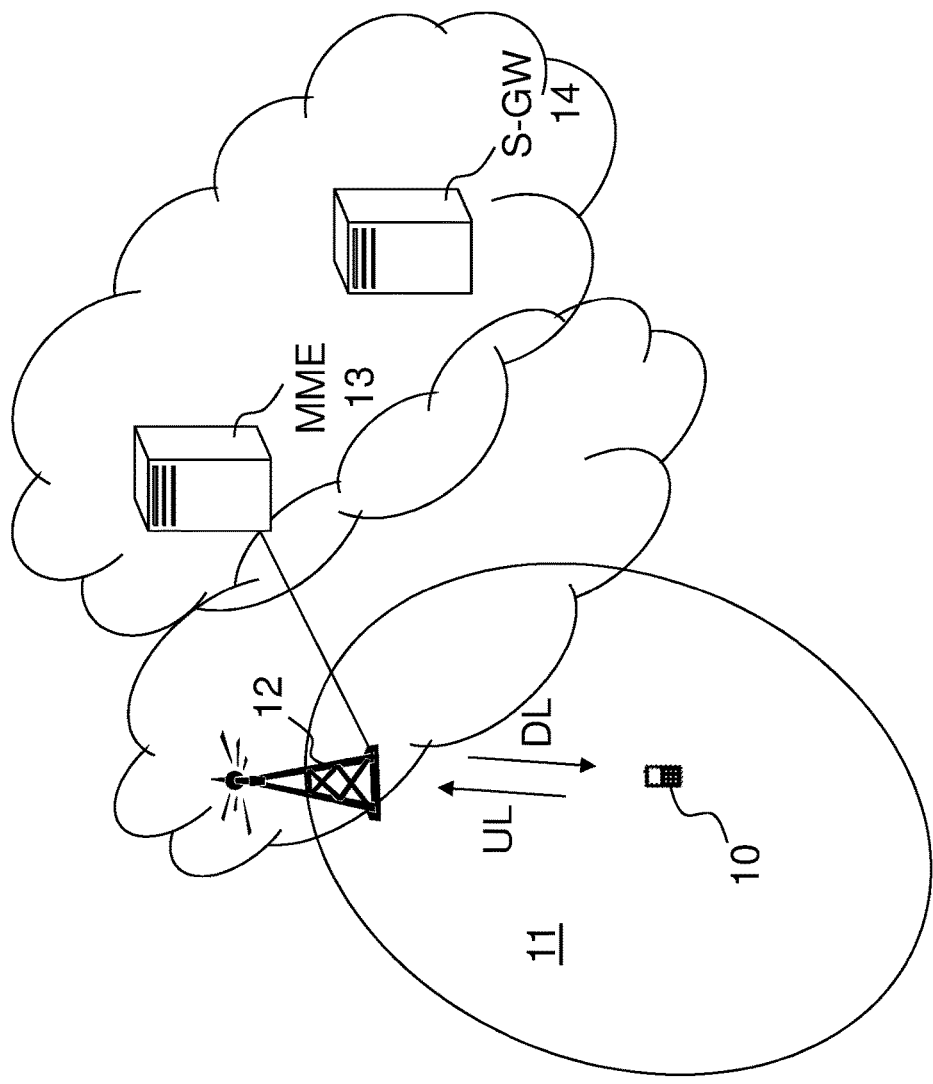
FIG. 3 shows a schematic overview depicting a wireless communication network according to embodiments herein.

Embodiments herein relate to wireless communication networks in general. FIG. 3 is a schematic overview depicting a wireless communication network 1. The wireless communication network 1 comprises one or more RANs and one or more CNs. The wireless communication network 1 may use a number of different technologies, such as Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. The wireless communication network 1 is exemplified herein as an LTE network.

In the wireless communication network 1, a wireless device 10, also known as a mobile station, a user equipment and/or a wireless terminal, communicates via a Radio Access Network (RAN) to one or more core networks (CN). It should be understood by the skilled in the art that "wireless device" is a non-limiting term which means any wireless terminal, user equipment, Machine Type Communication (MTC) device, Device to Device (D2D) terminal, or node e.g. Personal Digital Assistant (PDA), laptop, mobile phone, sensor, relay, mobile tablet or even a small base station communicating within respective cell.

The wireless communication network 1 covers a geographical area which is divided into cell areas, e.g. a cell 11 being served by a radio access node 12. The radio access node 12 may be a radio base station also referred to as a NodeB or an evolved Node B (eNB, eNode B), a base transceiver station, an Access Point Base Station, a base station router, a relaying wireless device or any other network unit capable of communicating with a wireless device within the cell served by the radio access node depending e.g. on the radio access technology and terminology used. The radio access node 12 may serve one or more cells, such as the cell 11.

A cell is a geographical area where radio coverage is provided by e.g. a radio base station equipment at a base station site or at remote locations in Remote Radio Units (RRU). The cell definition may also incorporate frequency bands and radio access technology used for transmissions, which means that two different cells may cover the same geographical area but using different frequency bands. Each cell is identified by an identity within the local radio area, which is broadcast in the cell. Another identity identifying the cell 11 uniquely in the whole wireless communication network 1 is also broadcasted in the cell 11. The radio access node 12 communicates over the air or radio interface operating on radio frequencies with the wireless device 10 within range of the radio access node 12. The wireless device 10 transmits data over the radio interface to the radio access node 12 in Uplink (UL) transmissions and the radio access node 12 transmits data over an air or radio interface to the wireless device 10 in Downlink (DL) transmissions.

Furthermore, the wireless communication network 1 comprises a Mobility Managing Entity (MME) 13. The MME 13 is a network node configured for paging and tagging procedure including retransmissions, and is also responsible for choosing a serving Gateway (S-GW) 14 for the wireless device 10 at the initial attach and at time of handover. The S-GW 14 is also a network node and routes and forwards user data packets, while also acting as an anchor for mobility between LTE and other 3GPP technologies. For idle state wireless devices, the S-GW 14 terminates the downlink data path and triggers paging when downlink data arrives for the wireless device 10. According to embodiments herein a paging process for a function relating to the wireless device 10 is disclosed. The function requires no connection to be set up e.g. for localisation of the wireless device 10, or activation of the wireless device 10 e.g. being a sensor or similar. A network node, e.g. the S-GW 14 or the MME 13, sends a paging request, for e.g. localization purpose of the wireless device 10, through a Paging channel, to all the radio access nodes within a same Tracking Area (TA), or being part of a TA list. The paging request comprises an ID of the wireless device 10 that the MME 13 wants to page. The radio access node 12 then builds, in response to receiving the paging request, a page message or paging message which is transmitted on a Paging Channel (PCH). The wireless device 10, listening to the PCH, receives the page message and tries to establish a RRC connection, by initiating a Random access procedure. The radio access node 12 receives a RRC connection request from the wireless device 10, and therefore the radio access node 12 is now aware of where the wireless device 10 is.

According to embodiments herein, the radio access node 12 may, based on knowledge that the paging request was for a "special Paging" for or assigned with a function that requires no connection, e.g. an RRC connection or core network connection, to be set up, e.g. for localization purposes, push back the wireless device 10 at this time without the wireless device 10 needing to know what type of paging this was. Thus, the radio access node 12 may send a second response e.g. a new RRC connection response message, which tells the wireless device 10 not to try to establish any RRC connection again, unless there are UL data to be sent in the UL.

Alternatively or additionally, embodiments herein are provided, wherein the wireless device 10 is provided with information about a type of page or actually receiving a message that comprises an indication that a paging is requested associated with or for a function relating to the wireless device 10, which function requires no connection to be set up, e.g. being a "special Paging" for localization purposes. The wireless device 10 may then transmit a response e.g. a new RRC message, for the function, which is not an RRC Connection Request and to which the radio access node 12 would not even need to consider connection establishment. Information of a type of page, e.g. a page for localization or similar, or indication of function may be provided, e.g. within the page message or within a RA Response.

Every time the MME 13 or the S-GW 14 wants to page the wireless device 10, only to e.g. understand in which cell the wireless device 10 is, e.g. for localization purpose, the current procedure imposes that the wireless device 10 will establish an RRC connection, which would cause heavy battery consumption, especially for M2M/MTC devices, in which the battery saving is a key feature, e.g. a battery for an M2M device is supposed to last for ten years. However, embodiments herein provide a solution where the MME 13 or the S-GW 14 may page the wireless device 10 e.g. only to understand where the wireless device 10 is, in which cell for e.g. localization purpose, without establishing an RRC connection. The radio access node 12 does not establish a connection or releases a connection and thereby reduces signalling to the wireless device 10 and thus the battery consumption at the wireless device 10.

Figure 4:
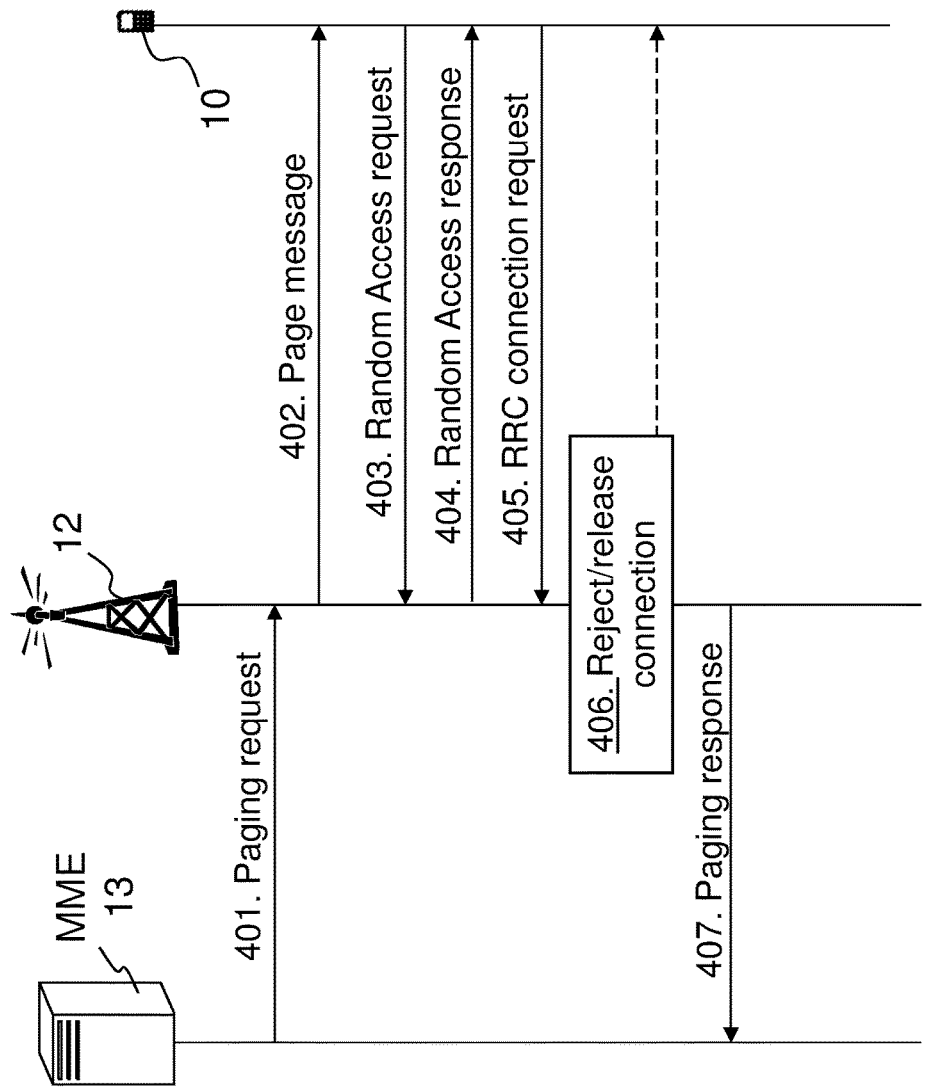
FIG. 4 shows a combined flowchart and signalling scheme depicting embodiments herein.

FIG. 4 is a combined flowchart and signaling scheme depicting some embodiments herein. A request for a "special Paging" for a function such as localization DL data arrives for the wireless device 10 at the S-GW 14 and the S-GW 14 creates a DL Data Notification message and forwards the DL Data Notification message to the MME 13.

Action 401. The MME 13 then transmits a paging request to the radio access node 12, the radio access node 12 being within a TA or being a part of a TA list. When the wireless device 10 is in ECM-Idle state, the wireless device 10 location is known to the MME 13 on a per TA basis. Therefore, the MME 13 pages with a special paging all radio base stations, including the radio access node 12, within a group of TA. Special paging meaning a paging request for the wireless device 10, which paging request comprises an indication. The indication indicates that the paging request is associated with a function relating to the wireless device 10, which function requires no connection to be set up. The MME 13 starts timer '3413' when paging is for PS data and/or the wireless device 10 is addressed by SAE-TMSI. The MME 13 may inform the radio access node 12 to broadcast a page message, being a special paging for the function such as localization, in the mentioned TAI's. The MME 13 may additionally send a DL Data Notification ACK message to the S-GW 14.

Action 402. The radio access node 12 receives a "special Paging" for the function and constructs an, RRC, page message e.g. for localization. At this action, from the wireless device 10 point of view, it can still be a normal page message, the wireless device 10 does not need to know at this action that this is a special paging for the function purpose. But the radio access node 12 needs to know that it is a "special Paging" for the function to decide whether there is no data following and whether it is safe to do a push back of the wireless device 10. The radio access node 12 then transmits the page message that may comprise multiple PAGING RECORDS to page multiple wireless devices.

The wireless device 10 wakes up every paging occasion and searches for P-RNTI of the wireless device 10 within the PDCCH transmission. If the wireless device 10 finds the P-RNTI then it proceeds to decode the PDSCH information which is present in PDCCH. The wireless device 10 then decodes the page message or the "special Paging" from a PDSCH Resource Block within which the page message is sent. Since the radio access node 12 knows that it is a "special Paging", i.e., knows that it is safe to push back the wireless device 10, the wireless device 10 does not need to know what type of paging this is at this point. But in other embodiments if the wireless device 10 is provided information about the type of page, "special Paging" for the function, the wireless device 10 may transmit a new RRC message which is not an RRC Connection Request and to which the radio access node 12 would not even need to consider connection establishment, unless there are wireless device data to be sent in UL. If instead there are wireless device data to be sent, in UL, the wireless device 10 may transmit a normal RRC message which is an RRC Connection Request. If the wireless device 10 doesn't find its own identity in the PDCCH then it returns to monitor the Paging Occasion. When the wireless device 10 finds its identity in the page message it triggers the Random Access Procedure. The radio access node 12 may thus inform the wireless device 10 of the function by including an indication of the function in the page message.

Action 403. The wireless device 10 may transmit a random access request, being an example of the response of the page message, from the wireless device 10 to the radio access node 12.

Action 404. The radio access node 12 may transmit a random access response back to the wireless device 10. The radio access node 12 may alternatively or additionally inform the wireless device 10 of the function by including an indication of the function in the random access response instead or as a complement to an indication in the page message.

Action 405. The wireless device 10 then transmits an RRC connection request, being another example of the response of the page message from the radio access node 12, to the radio access node 12.

Action 406. In some embodiments, the radio access node 12 can, based on the knowing that the page was a "special Paging", for e.g. localization, reject connection establishment or release a connection e.g. by pushing back the wireless device 10 at this time without the wireless device 10 needing to know what type of paging this was. The radio access node 12 or the MME 13 may respond to the RRC connection request with a second response e.g. a new RRC connection response message which tells the wireless device 10 not to try to establish any RRC connection again. This may alternatively be informed in the random access response, being another example of the second response, in action 404 as a response to the random access request in action 403.

In some embodiments wherein the wireless device 10 is provided with an indication associated with the function e.g. information about the type of page, such as a "special Paging" for localization, the wireless device 10 may transmit a new RRC message, being an example of the first response, which is not an RRC Connection Request and to which the radio access node 12 would not even need to consider connection establishment.

Action 407. The radio access node 12 may additionally transmit a third response, e.g. a paging response, to the MME 13 or the S-GW 14. E.g. the MME 13 or the S-GW 14 sees from which radio access node, and maybe from which sector of it, a paging response comes from, so the MME 13 or the S-GW 14 automatically knows where the wireless device 10 is located, i.e. in which radio access node 12 the wireless device 10 is trying to connect to. The information about the location may be sent to the MME 13 and stored in a HSS/Home Location Register (HLR), or maybe in the HSS/HLR there is stored to which the MME 13 the wireless device 10 belongs to.

Figure 5:
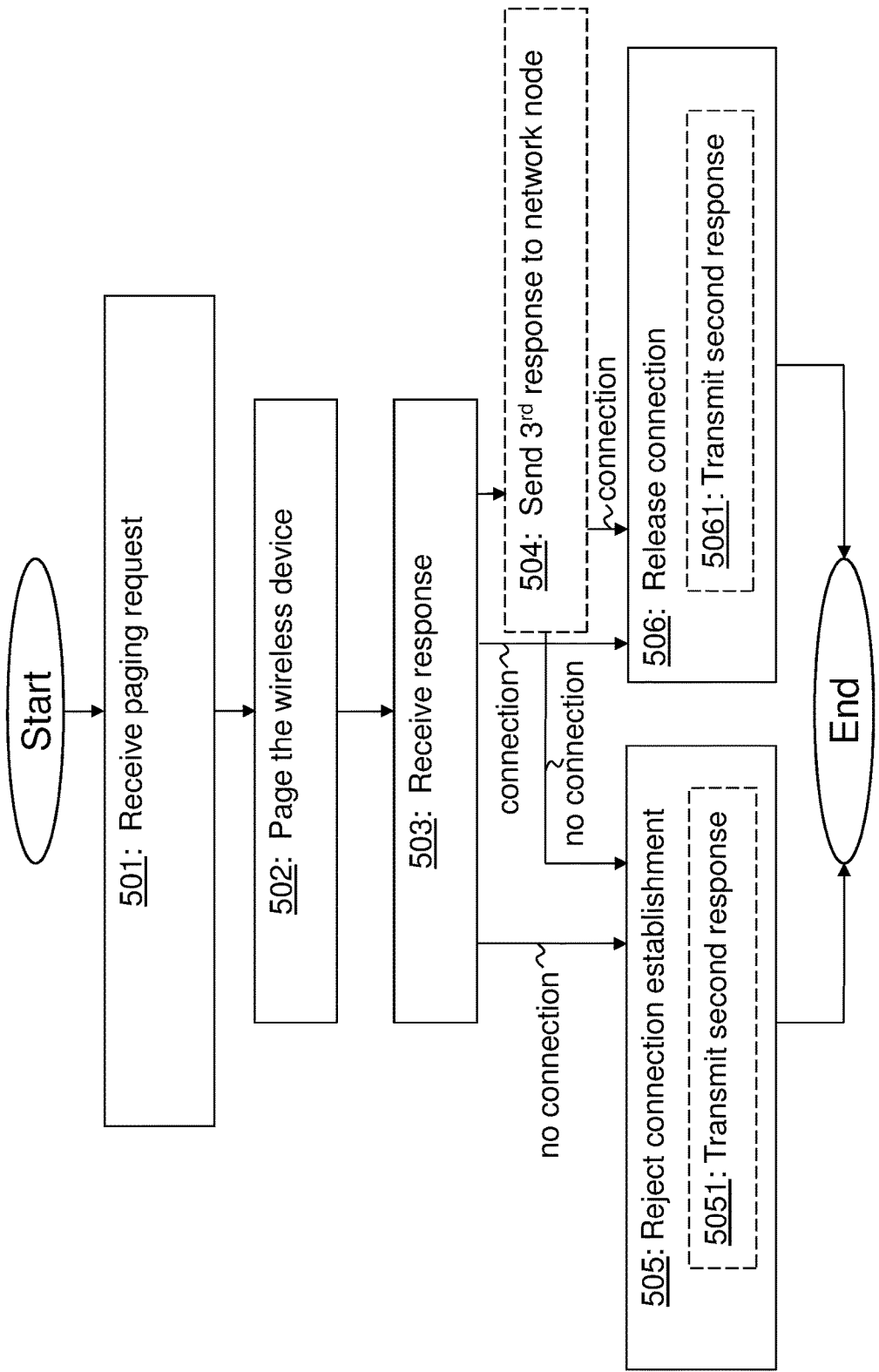
FIG. 5 shows a flowchart depicting a method in a radio access node according to embodiments herein.

The method actions performed in the radio access node 12 for handling the wireless device 10 in the wireless communication network 1 according to some embodiments will now be described with reference to a flowchart depicted in FIG. 5. The actions do not have to be taken in the order stated below, but may be taken in any suitable order. Actions performed in some embodiments are marked with dashed boxes. The radio access node 12 serves the cell 11 in the wireless communication network 1.

Action 501. The radio access node 12 receives a paging request for the wireless device 10 from a network node, such as the MME 13 or the S-GW 14. The paging request comprises an indication, which indication indicates that the paging request is associated with a function relating to the wireless device 10. E.g. the function may be localization of the wireless device 10, status check of the wireless device 10 and/or activation of the wireless device 10. The function requires no connection between the wireless device 10 and the radio access node 12 to be set up, e.g. the function may require that no RRC Connection and/or no Core network connection is to be set up.

Action 502. The radio access node 12 pages the wireless device 10 in the cell 11 with a page message. The page message may comprise an indication that the paging is associated with the function relating to the wireless device 10. This corresponds to action 402 in FIG. 4. Alternatively, a random access message, transmitted after the page message, may comprise the indication as shown in action 404 in FIG. 4 in some embodiments where the wireless device 10 is informed of the function.

Action 503. The radio access node 12 receives a response, also referred to as a first response, from the wireless device 10 in response to the page message. The response being e.g. a random access request, an RRC connection request or an establishment request. The response may comprise an indication indicating that no connection establishment is necessary, e.g. a bit in the response indicating this.

Action 504. The radio access node 12 may, when receiving the response from the wireless device 10, send another response, referred to as the third response herein, to the network node, e.g. the MME 13, in order for the network node to receive a response for the function requested in the paging request. This corresponds to action 407 in FIG. 4 and may also be performed after or simultaneously as the actions 505 and 506 below.

Action 505. The radio access node 12 then, if no connection is set up, rejects a connection establishment from the wireless device 10 to the radio access node 12, based on the indication in the paging request and/or the indication in the received response indicating that no connection establishment is necessary. This corresponds to action 406 in FIG. 4. The received response may be a connection request, such as a connection establishment request and the radio access node 12 may then reject the connection request based on the indication in the received paging request. The received response may be an RRC message with an indication indicating that no connection establishment is necessary and then the radio access node 12 rejects the connection based on the indication in the RRC message. Action 5051. In case of rejection, the radio access node 12 may then transmit a second response which informs the wireless device 10 not to try another connection request.

Action 506. If a connection is set up to the network, the radio access node 12 releases a connection from the wireless device 10 to the radio access node 12, based on the indication in the received paging request and/or an indication in the received response indicating that no connection establishment is necessary. This corresponds to action 406 in FIG. 4. The received response may be a connection request and the radio access node releases the connection based on the indication in e.g. the paging request. The received response may be an RRC message with an indication indicating that no connection establishment is necessary and then the radio access node 12 releases the connection based on the indication in the RRC message. Action 5061. In case of release of the connection, the radio access node 12 may then transmit a second response which informs the wireless device 10 not to try another connection request.

Actions 505 and 506 are examples of the action 406 in FIG. 4.

Figure 6:
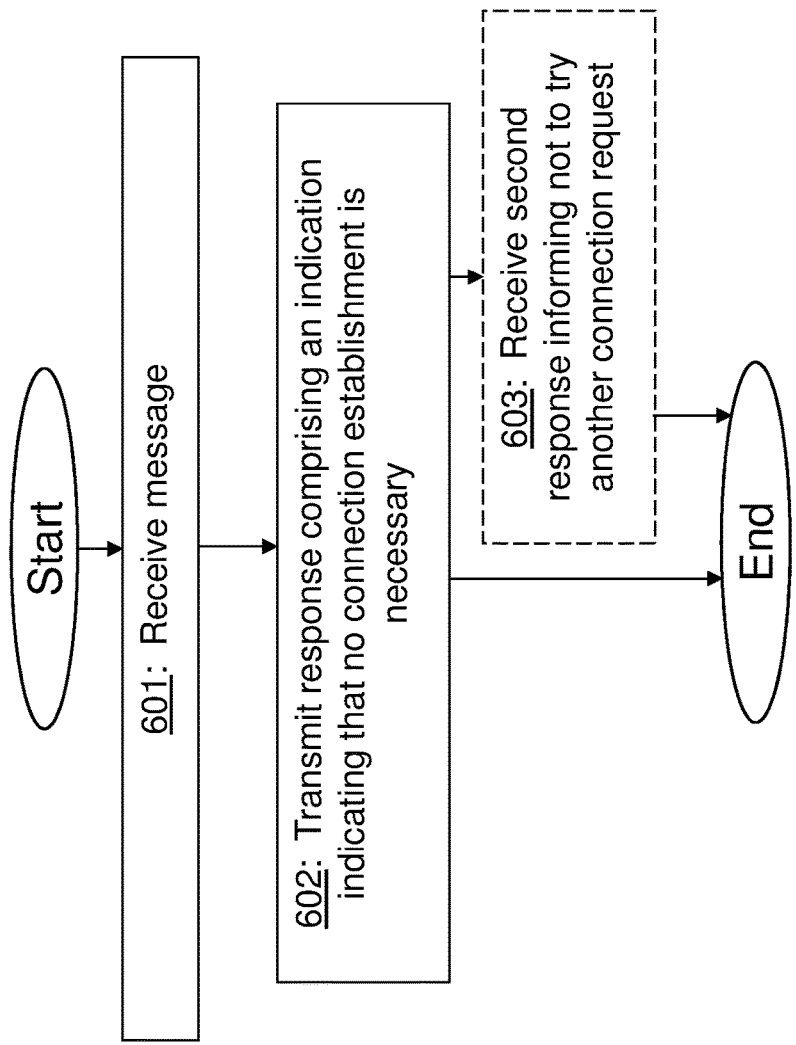
FIG. 6 shows a flowchart depicting a method in a wireless device according to embodiments herein.

The method actions in the wireless device 10 for handling communication in the wireless communication network 1 according to some embodiments will now be described with reference to a flowchart depicted in FIG. 6. The wireless communication network 1 comprises the radio access node 12 serving the wireless device 10 in the cell 11 of the radio access node 12.

Action 601. The wireless device receives a message from the radio access node 12. The message comprises an indication that a paging is requested associated with a function relating to the wireless device 10, which function requires no connection between the wireless device 10 and the radio access node 12 to be set up. E.g. the function requires no Radio Resource Control Connection and/or no Core network connection to be set up, the function may be e.g. localization of the wireless device 10, status check of the wireless device 10, and/or activation of the wireless device 10. The received message may be a page message or a random access message, see actions 402,404,502 disclosing the transmission of the message. The random access message may be a RA response and then the radio access node 12 distinguishes the wireless device's random access preamble sequence transmission prior to sending an indication in the RA response. This could be done, e.g., by assigning an assignment to the wireless device 10 with a special resource or preamble for its access attempt. The assignment may for instance be provided/indicated in the page message to the wireless device 10. The indication may be related to a page which was received in a previous action of the procedure; i.e., refer to the page which triggered, e.g., the random access procedure during which the indication is received in a random access response. The indication may comprise further information about the function other than that no connection between the wireless device 10 and the radio access node 12 is needed to be set up.

Action 602. The wireless device 10 transmits, in response to the received message, a response, also referred to as the first response, to the radio access node 12, which response comprises an indication indicating that no connection establishment is necessary. The transmitted response may be a RRC message with the indication indicating that no connection establishment is necessary, e.g. a connection establishment request with such an indication. Examples of the response comprising the indication may be a random access request, see action 403 above, or an RRC connection request, see action 405 above.

Action 603. The wireless device 10 may receive from the radio access node 12 a second response which informs the wireless device 10 not to try another connection request.

Figure 7:
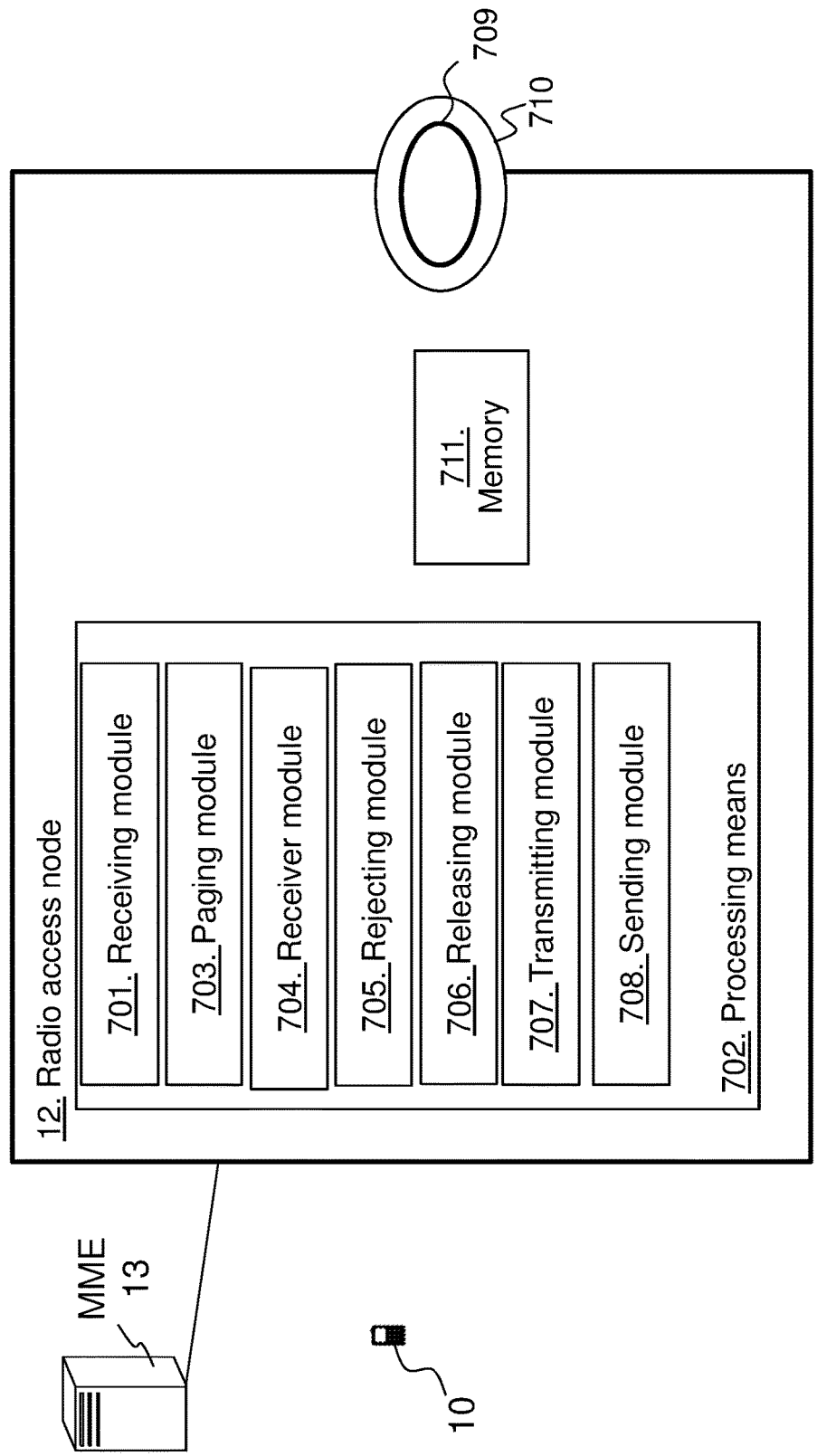
FIG. 7 shows a block diagram depicting a radio access node according to embodiments herein.

In order to perform the method herein a radio access node is herein provided. FIG. 7 is a block diagram depicting the radio access node 12 for handling the wireless device 10 in the wireless communication network 1 according to embodiments herein. The radio access node 12 is configured to serve the cell 11 in the wireless communication network 1.

The radio access node 12 is configured e.g. by means of a receiving module 701, to receive a paging request for the wireless device 10 from a network node, e.g. the MME 13 or the S-GW 14. The paging request comprises an indication, which indication indicates that the paging request is associated with a function relating to the wireless device 10, which function requires no connection between the wireless device 10 and the radio access node 12 to be set up. The function may e.g. be localization of the wireless device 10; status check of the wireless device 10; and/or activation of the wireless device 10. The function may require e.g. no Radio Resource Control Connection and/or no Core network connection to be set up. The receiving module 701 may be a processor or processing means 702 of the radio access node 12.

The radio access node 12 is further configured e.g. by means of a paging module 703, to page the wireless device in the cell 11 with a page message. The paging module 703 may be a processor or the processing means 702 of the radio access node 12. The page message or a random access message may comprise an indication that the paging is associated with the function relating to the wireless device 10.

The radio access node 12 is in addition configured e.g. by means of a receiver module 704 or transceiver, to receive a response from the wireless device 10 in response to the page message. The receiver module 704 may be a processor or the processing means 702 of the radio access node 12.

The radio access node 12 is configured e.g. by means of a rejecting module 705, to reject a connection establishment from the wireless device 10 to the radio access node 12, based on the indication in the received paging request, and/or an indication in the received response indicating that no connection establishment is necessary. The rejecting module 705 may be a processor or the processing means 702 of the radio access node 12.

The radio access node 12 is configured e.g. by means of a releasing module 706, to release a connection, from the wireless device 10 to the radio access node 12, based on the indication in the received paging request, and/or an indication in the received response indicating that no connection establishment is necessary. The releasing module 706 may be a processor or the processing means 702 of the radio access node 12.

The received response may be a connection request and then the radio access node 12, the rejecting module 705, the releasing module 706 and/or the processing means 702 may be configured to reject the connection request or release the connection based on the indication in the received paging request. The radio access node 12 may then be configured e.g. by means of a transmitting module 707, to transmit a second response which informs the wireless device 10 not to try another connection request. The transmitting module 707 may be a processor or the processing means 702 of the radio access node 12.

The received response may be a RRC message with an indication indicating that no connection establishment is necessary and the radio access node 12, the rejecting module 705, the releasing module 706 and/or the processing means 702 may be configured to reject the connection establishment or release the connection based on the indication in the RRC message.

The radio access node 12 is configured e.g. by means of a sending module 708, to send a third response to the network node, such as the MME13 and/or the S-GW 14, when receiving the response from the wireless device 10. The sending module 708 may be a processor or the processing means 702 of the radio access node 12.

The embodiments herein for handling the wireless device 10 may be implemented through the processing means 702 e.g. comprising one or more processors, in the radio access node 12 depicted in FIG. 7, that e.g. together with computer program code, may perform the functions and/or method actions of the embodiments herein. The methods according to the embodiments described herein may be implemented by means of e.g. a computer program 709 or a computer program product, comprising instructions, i.e., software code portions, which, when executed on at least one processor, cause the at least one processor to carry out the actions described herein, as performed by the radio access node 12. The computer program 709 may be stored on a computer-readable storage medium 710, e.g. a disc or similar. The computer-readable storage medium 710, having stored thereon the computer program 709, may comprise the instructions which, when executed on at least one processor, cause the at least one processor to carry out the actions described herein, as performed by the radio access node 12. In some embodiments, the computer-readable storage medium may be a non-transitory computer-readable storage medium.

The radio access node 12 further comprises a memory 711. The memory comprises one or more units to be used to store data on, such as transmission parameters, RA data, applications to perform the methods disclosed herein when being executed, and similar.

Figure 8:
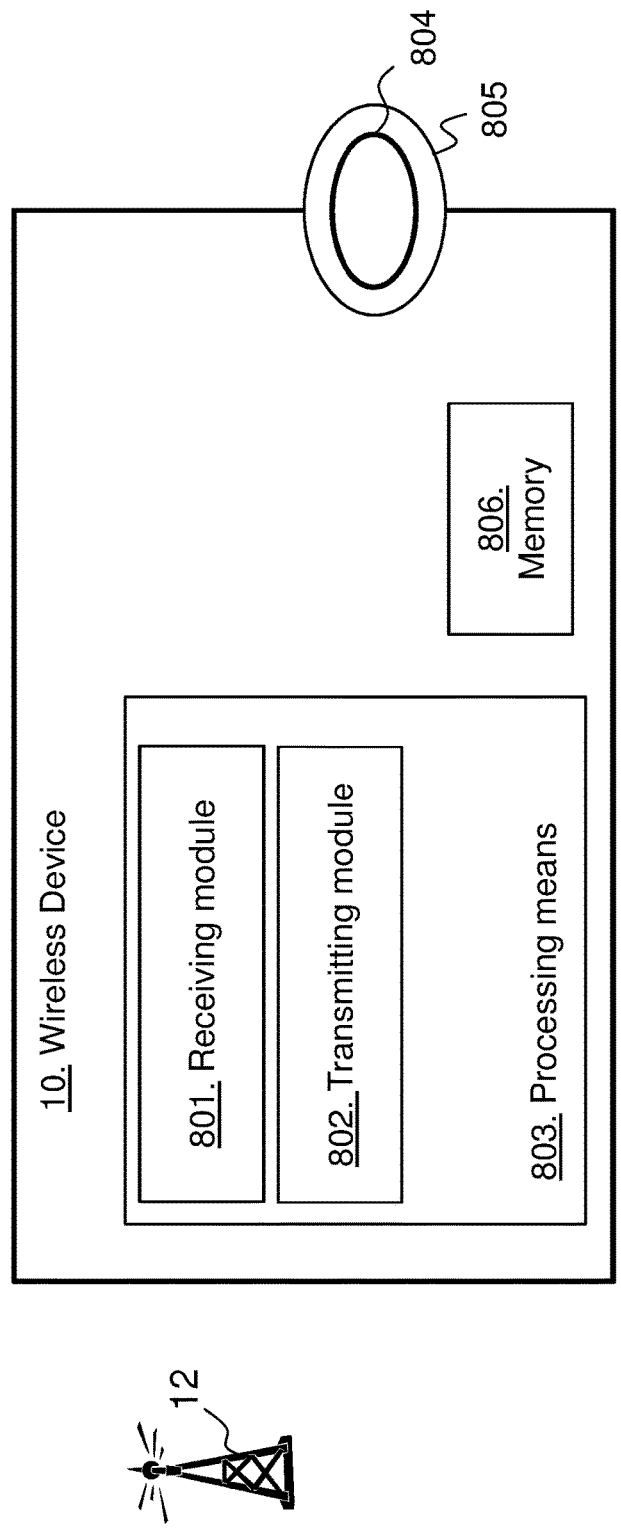
FIG. 8 shows a block diagram depicting a wireless device according to embodiments herein.

In order to perform the method herein the wireless device 10 is herein provided. FIG. 8 is a block diagram depicting the wireless device 10 for handling communication in the wireless communication network 1 according to embodiments herein. The wireless device 10 is configured to be served by the radio access node 12 in the cell 11 of the radio access node 12 in the wireless communication network 1.

The wireless device 10 is configured, e.g. by comprising a receiving module 801 or receiver (RX), to receive a message from the radio access node 12. The message comprises an indication that a paging is requested associated with a function relating to the wireless device 10. The function requires no connection between the wireless device 10 and the radio access node 12 to be set up. The received message may be a page message, i.e. the page message comprises the indication, e.g. one or more bits, indicating the function, or a random access message, e.g. a RA response comprising one or more bits indicating the function. The function may e.g. be localization of the wireless device 10, status check of the wireless device 10, and/or activation of the wireless device 10. The function may require no Radio Resource Control Connection and/or no Core network connection to be set up. The wireless device 10 and/or the receiving module 801 may be configured to receive a second response from the radio access node 12, which second response informs the wireless device 10 not to try another connection request.

The wireless device 10 is configured, e.g. by comprising a transmitting module 802, to transmit the response to the radio access node 12 in response to the received message, which response comprises an indication indicating that no connection establishment is necessary. The response may be a Radio Resource Control message, such as a RRC connection establishment request, with the indication indicating that no connection establishment is necessary, the indication may comprise a certain random access preamble sequence indicating the function.

The embodiments herein for handling communication may be implemented through processing means 803 e.g. comprising one or more processors, in the wireless device 10 depicted in FIG. 8, that e.g. together with computer program code, may perform the functions and/or method actions of the embodiments herein. The methods according to the embodiments described herein may be implemented by means of e.g. a computer program 804 or a computer program product, comprising instructions, i.e., software code portions, which, when executed on at least one processor, cause the at least one processor to carry out the actions described herein, as performed by the wireless device 10. The computer program 804 may be stored on a computer-readable storage medium 805, e.g. a disc or similar. The computer-readable storage medium 805, having stored thereon the computer program 804, may comprise the instructions which, when executed on at least one processor, cause the at least one processor to carry out the actions described herein, as performed by the wireless device 10. In some embodiments, the computer-readable storage medium may be a non-transitory computer-readable storage medium.

The wireless device 10 further comprises a memory 806. The memory 806 comprises one or more units to be used to store data on, such as transmission parameters, RA data, applications to perform the methods disclosed herein when being executed, and similar.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless terminal or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance trade-offs inherent in these design choices.

It will be appreciated that the foregoing description and the accompanying drawings represent non-limiting examples of the methods and apparatus taught herein. As such, the inventive apparatus and techniques taught herein are not limited by the foregoing description and accompanying drawings. Instead, the embodiments herein are limited only by the following claims and their legal equivalents.

The invention claimed is:

1. A method performed in a radio access node for handling a wireless device in a wireless communication network, which radio access node serves a cell in the wireless communication network, the method comprising:
   receiving a paging request for the wireless device from a network node, which paging request comprises an indication, which indication indicates that the paging request is associated with a function relating to the wireless device, which function requires no connection between the wireless device and the radio access node to be set up, wherein the function is at least a status check of the wireless device and activation of the wireless device;
   paging the wireless device in the cell with a page message, which the page message comprises an indication that the paging is associated with the function relating to the wireless device;
   receiving a response from the wireless device in response to the page message, wherein the received response is a connection request;
   rejecting a connection establishment or releasing a connection, from the wireless device to the radio access node, based on the indication in the received paging request and/or an indication in the received response indicating that no connection establishment is necessary;
   transmitting a second response which informs the wireless device not to transmit another connection request; and
   sending a third response to the network node when receiving the response from the wireless device, wherein the third response is sent simultaneously or after the rejecting of the connection or the releasing of the connection.

2. The method of claim 1, wherein the received response is a Radio Resource Control message with an indication indicating that no connection establishment is necessary and the rejecting or the releasing is based on the indication in the Radio Resource Control message.

3. The method of claim 1, wherein the function is localization of the wireless device.

4. The method of claim 1, wherein the function requires no Radio Resource Control Connection and/or no Core network connection to be set up.

5. A computer program product comprising a non-transitory computer readable medium storing instructions which, when executed on at least one processor, cause the at least one processor to carry out the method of claim 1.

6. A method performed in a wireless device for handling communication in a wireless communication network, which wireless communication network comprises a radio access node serving the wireless device in a cell of the radio access node, comprising:
   receiving a message from the radio access node, which message comprises an indication that a paging is requested associated with a function relating to the wireless device, which function requires no connection between the wireless device and the radio access node to be set up, wherein the function is at least a status check of the wireless device and activation of the wireless device;
   transmitting a response to the radio access node in response to the received message, which response comprises an indication indicating that no connection establishment is necessary, wherein the response is a connection request, wherein the transmitted response is a Radio Resource Control message; and
   receiving a second response from the radio access node upon rejecting a connection establishment or releasing a connection, which second response informs the wireless device not to transmit another connection request;
   wherein the radio access node is configured to send a third response to a network node when receiving the response from the wireless device, wherein the third response is sent simultaneously or after the rejecting of the connection or the releasing of the connection.

7. The method of claim 6, wherein the received message is a page message or a random access message.

8. The method of claim 6, wherein the function is localization of the wireless device.

9. The method of claim 6, wherein the function requires no Radio Resource Control Connection and/or no Core network connection to be set up.

10. A computer program product comprising a non-transitory computer readable medium storing instructions which, when executed on at least one processor, cause the at least one processor to carry out the method of claim 6.

11. A radio access node for handling a wireless device in a wireless communication network, which radio access node is configured to serve a cell in the wireless communication network, wherein the radio access node is further configured to:
   receive a paging request for the wireless device from a network node, which paging request comprises an indication, which indication indicates that the paging request is associated with a function relating to the wireless device, which function requires no connection between the wireless device and the radio access node to be set up, wherein the function is at least a status check of the wireless device and activation of the wireless device;
   page the wireless device in the cell with a page message, which the page message comprises an indication that the paging is associated with the function relating to the wireless device;
   receive a response from the wireless device in response to the page message, wherein the received response is a connection request;

reject a connection establishment or release a connection, from the wireless device to the radio access node, based on the indication in the received paging request, and/or an indication in the received response indicating that no connection establishment is necessary; transmit a second response which informs the wireless device not to transmit another connection request; and sending a third response to the network node when receiving the response from the wireless device, wherein the third response is sent simultaneously or after the rejecting of the connection or the releasing of the connection.

12. The radio access node of claim 11, wherein the received response is a Radio Resource Control message with an indication indicating that no connection establishment is necessary and the radio access node is further configured to reject the connection establishment or release the connection based on the indication in the Radio Resource Control message.

13. The radio access node of claim 11, wherein the function is: localization of the wireless device.

14. The radio access node of claim 11, wherein the function requires no Radio Resource Control Connection and/or no Core network connection to be set up.

15. A wireless device for handling communication in a wireless communication network, wherein the wireless device is configured to be served by a radio access node in a cell of the radio access node in the wireless communication network, the wireless device being further configured to:

receive a message from the radio access node, which message comprises an indication that a paging is requested associated with a function relating to the wireless device, which function requires no connection between the wireless device and the radio access node to be set up, wherein the function is at least a status check of the wireless device and activation of the wireless device;

transmit a response to the radio access node in response to the received message, which response comprises an indication indicating that no connection establishment is necessary, wherein the received response is a connection request, wherein the response is a Radio Resource Control message; and to receive a second response from the radio access node upon rejecting a connection establishment or releasing a connection, which second response informs the wireless device not to transmit another connection request;

wherein the radio access node is configured to send a third response to a network node when receiving the response from the wireless device, wherein the third response is sent simultaneously or after the rejecting of the connection or the releasing of the connection.

16. The wireless device of claim 15, wherein the received message is a page message or a random access message.

17. The wireless device of claim 15, wherein the function is localization of the wireless device.

18. The wireless device of claim 15, wherein the function requires no Radio Resource Control Connection and/or no Core network connection to be set up.

* * * * *